No. 894,060. PATENTED JULY 21, 1908.
R. RUEMELIN.
MOTOR VEHICLE.
APPLICATION FILED JULY 1, 1907.
3 SHEETS—SHEET 3.
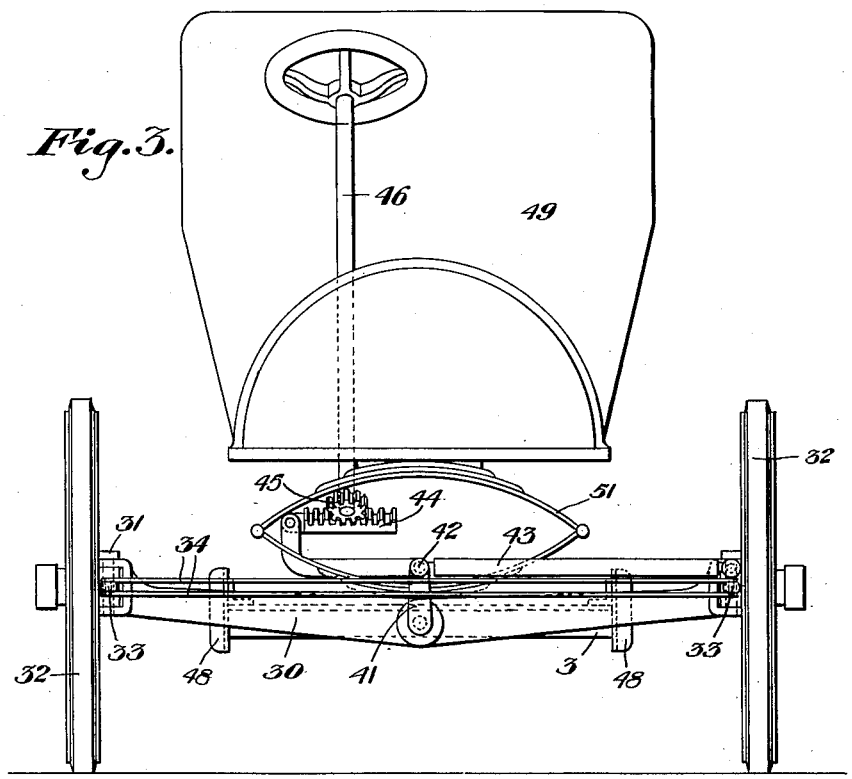
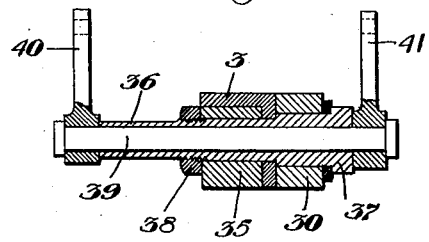
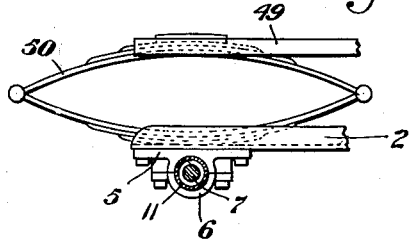
Witnesses
Chas. S. Sepley.
Fred Stout.
Inventor:
Richard Ruemelin
by C. M. Clarke
his Attorney

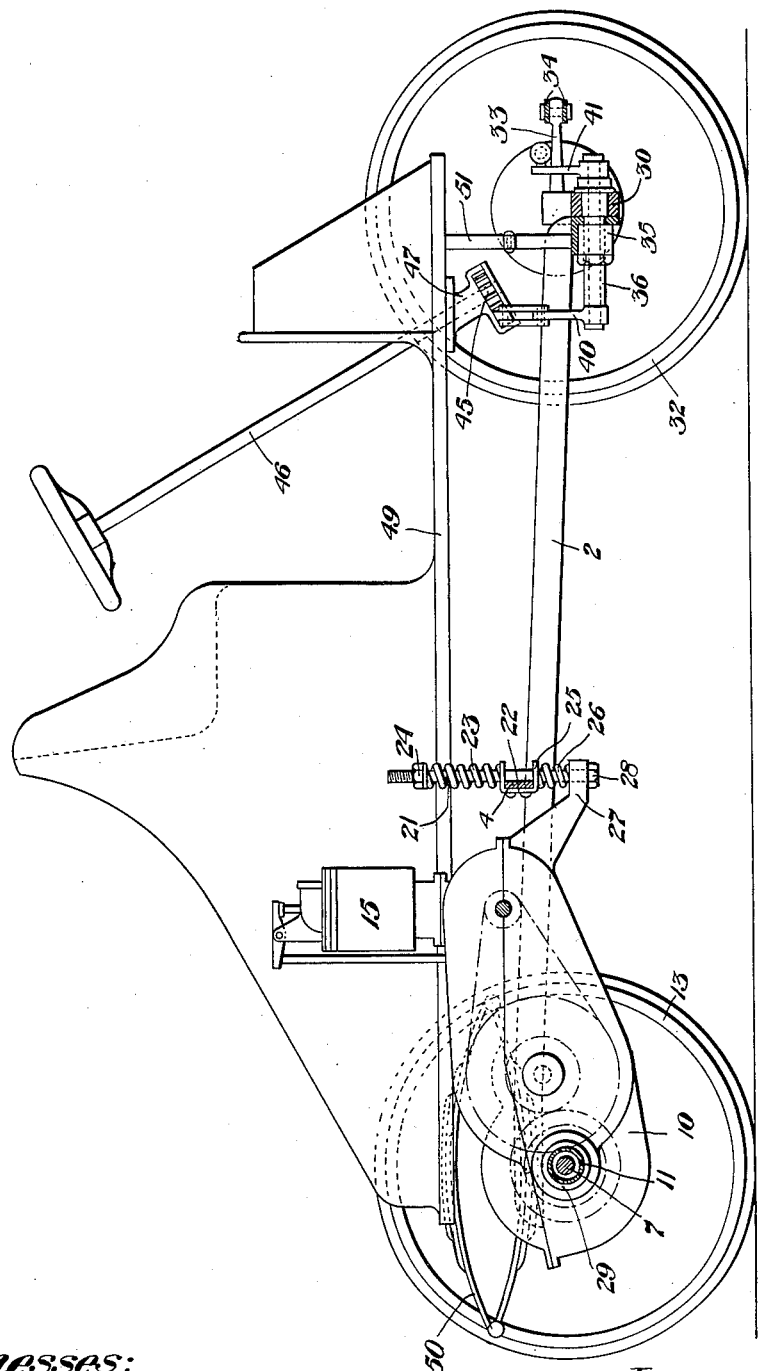

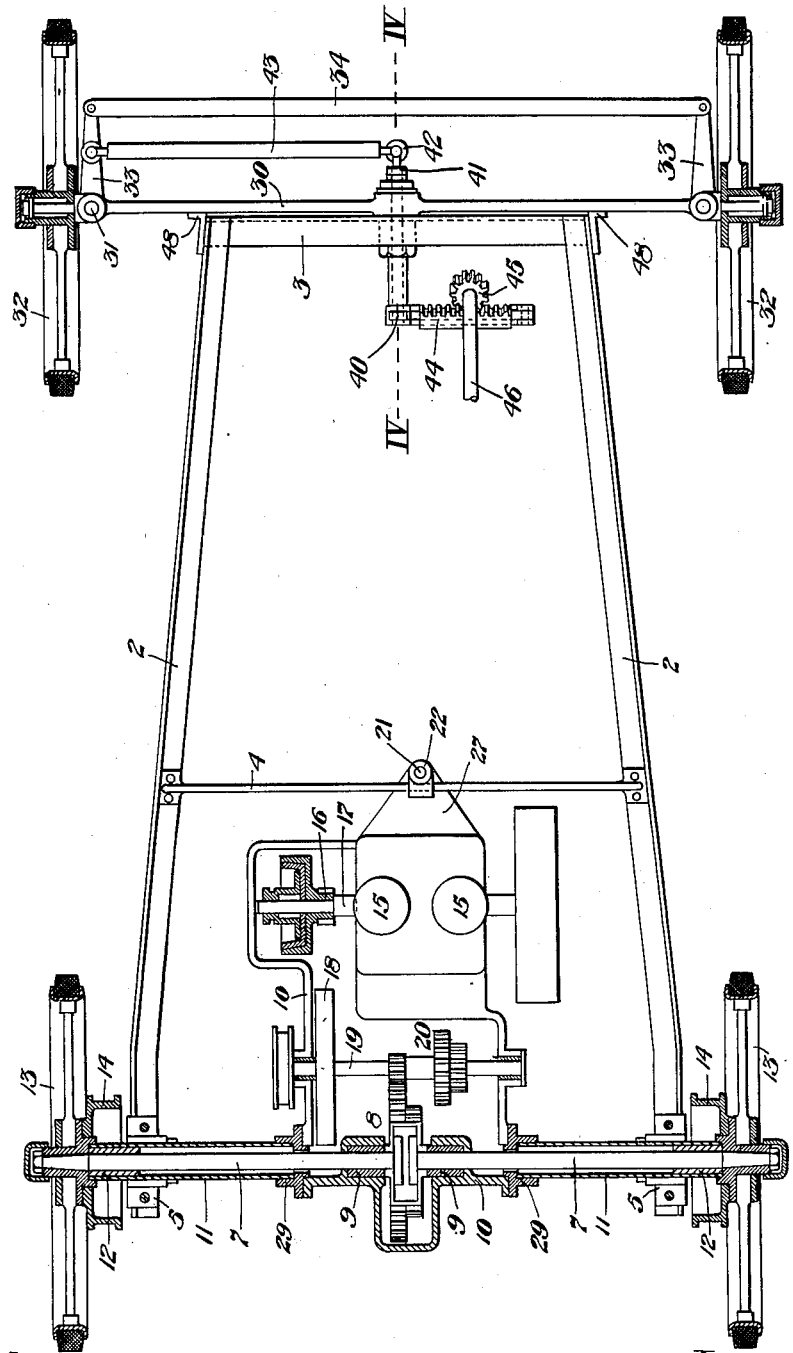

UNITED STATES PATENT OFFICE.

RICHARD RUEMELIN, OF HUNTINGDON, PENNSYLVANIA.

MOTOR-VEHICLE.

No. 894,060.

Specification of Letters Patent.

Patented July 21, 1908.

Application filed July 1, 1907. Serial No. 381,608.

*To all whom it may concern:*

Be it known that I, RICHARD RUEMELIN, a citizen of the United States, residing at Huntingdon, in the county of Huntingdon and State of Pennsylvania, have invented certain new and useful Improvements in Motor-Vehicles, of which the following is a specification, reference being had therein to the accompanying drawing.

My invention relates to improvements in motor vehicles and it has for its objects to provide a construction employing a sub-frame adapted to support all of the power mechanism entirely independent of the carriage body; to provide a simple, automatically adjustable connection between the front axle and the sub-frame to prevent torsional strain due to unequality in the road; to provide means whereby the entire power equipment and driving axle and wheels may be bodily removed from the sub-frame; an improved and simplified steering mechanism; and other features of novelty and advantage as shall be more fully hereinafter described.

Referring to the drawings:—Figure 1 is a longitudinal vertical sectional view of the machine. Fig. 2 is a plan view of the sub-frame, portions of the axle, wheels and power equipment being shown in section. Fig. 3 is a view in front elevation of the machine partly broken away. Fig. 4 is a vertical sectional detail view indicated by the line IV. IV. of Fig. 2. Fig. 5 is a detail view in elevation showing the mounting of the rear springs.

The main sub-frame or underframe consists of a framework composed of side bars 2, 2, of any suitable cross section, as angles, and preferably of structural steel, connected at their front ends to cross bar or sill 3 and intermediate of their ends by transverse motor-supporting bar 4.

5, 5, represents journal bearings for the rear axle and its housing, the lower caps 6 of which bearings are removable for the purpose of bodily removing the rear axle and the entire power equipment upon jacking up the frame.

The rear driving axle consists of two sections 7, 7, divided at their middle portion for the purpose of driving either axle section independently of the other by the usual or any suitable transmission gearing, indicated at 8.

The axle sections 7 are mounted at their inner ends within bearings 9, 9, of casing 10 of the engine frame, and at their outer portions, within their inclosing shells in journal boxes 5.

The axle sections 7 are surrounded at their outer portions beyond the engine casing at each side by tubular shells 11, 11, within which the axle rotates, said shells being provided with suitable bearings 12, 12, at their outer ends and carrying the rear supporting traction wheels 13, 13, with suitable braking drums 14, 14.

The motor frame or casing 10 is so constructed as to inclose within a dust-proof inclosure all of the working parts, gearing, etc., and is provided with the usual actuating cylinder or cylinders 15, either vertical or horizontal, together with the usual valves, connections and other mechanism commonly employed with motors of this type. Transmission of power from the engine or from the motor of any suitable type to the axle may be effected through any suitable gearing, as by gears or sprocket chain from the drive wheel 16 on engine shaft 17 to driven wheel 18 on shaft 19, and from thence through change speed gearing 20 and transmission 8 to the axle.

At its forward end the engine casing 10 is supported at one point only by means of a bolt 21 supported in bracket 22 through which it passes, by means of a surrounding cushion spring 23, the bolt 21 bearing thereon by its head 24 and passing downwardly through the bracket 22 which is rigidly mounted on cross bar 4, by means of an embracing clevis or frame 25. The bolt 21 extends below supporting bracket 22 with an intervening cushion spring 26, and engages the forwardly extending bracket 27 of the engine casing by its lower bolt head or nut 28. The engine casing at its rear portion is provided with separable flanged collars 29 secured at each outer side of the casing around the axle sections 7 and fixedly secured to shell 11. The entire rear portion of the engine casing is thus incorporated with the said sections 11 in such a manner as to provide a continuous journaled mounting for the back portion of the power equipment. By this construction, in combination with the single-point front support, the whole power plant of the vehicle is mounted upon the under-frame without any connection whatever with the vehicle body, in such a manner as to be resiliently mounted to avoid the jarring effect of shocks or vibrations of the frame in service.

At its forward end the under-frame is connected with the front axle by a horizontal pivotal joint inclosing the steering mechanism constructed in the following manner; 30 represents the front axle shown in elevation in Fig. 3, of any suitable design to support the load, having mounted at each outer end by the usual vertical bolts 31, the separate front wheels 32. Said front wheels are, as is commonly the case, independently mounted, and are connected by crank extensions 33 and connecting rod 34 so as to work together. 35 is a bearing box mounted upon the front sill 3, through which passes a tubular bearing shell 36 which likewise passes through axle 30 as shown, said shell being of sufficient strength and rigidity to provide a strong bearing. As thus connected it will be seen that the front end of the under-frame is pivotally mounted upon the axle so that either wheel may rise or fall or the front axle 30 may be deflected up or down to any extent without imparting any resulting movement or torsion to the under-frame.

Sleeve 36 is secured within the axle and sill 3 by suitable means, as a flanged collar 37 at the front and a holding nut 38 at the back, or by any similar efficient mechanism, and in addition to the function of pivotally supporting and connecting the sill and axle, also provides a tubular bearing for the steering rock shaft. Said rock shaft 39 is mounted within tube 36, extends through it from the back to the front, and is provided with back and front levers 40 and 41 respectively. The front lever 41 is connected by universal joint 42 and connecting rod 43 with cranks 33 of the front wheel frames, while crank 40 at the back is connected with any suitable actuating mechanism. I have shown in the drawings a rack bar 44 for such purpose, actuated by pinion 45 at the lower end of the steering rod 46 of well known type, mounted in any suitable bearings 47, but it will be observed that any other means for actuating the rock shaft 39 and for swinging the front wheels may be used.

In order to provide good bearing surfaces between the front sill 3 and the relatively movable vertically oscillating axle 30 flat faced shoes 48 are secured to the corners of the under-frame at each side in front extending above and below sufficiently far to insure engagement against the back portion of the axle 30 at all positions. By this means the direct thrust of the underframe against the axle is insured independent of whatever position the axle may assume.

49 represents the vehicle body, of any design or type, mounted entirely independently of the working mechanism and above the main frame upon the back elliptical springs 50, set above the journal bearing 5 at each side of the main frame, and upon the single transversely arranged elliptical spring 51 mounted upon front sill 3, said springs supporting at their upper portion the vehicle body only.

By means of the construction above described it will be seen that the load of the driving mechanism is in no way supported by the vehicle body, but entirely upon the under-frame, leaving the vehicle entirely free above its supporting springs and available for the weight of the passengers. The balance and equilibrium of the machine, due to the mounting of the front axle and of the power equipment, are features of great advantage; the simplicity of the steering mechanism is novel and valuable; the removability of the motor and its parts with the rear axle facilitates repair or examination; and these various features of advantage will be fully appreciated by all those familiar with this class of vehicles. The fact that the vehicle body is light and supported entirely by its springs without the burden of the power equipment renders it unnecessary to employ especially resilient tires or the ordinary pneumatic tires, so that solid tires may be used of the type shown. I consider this as one of the important features of the invention, obviating the necessity and expense of the usual pneumatic equipment, without sacrificing any of the desired elasticity or resiliency of the carriage body.

The various features of improvement which I have described may be incorporated with motor vehicles of varying types or design and the invention may be greatly varied or changed by the skilled mechanic, as I do not desire to be limited to the exact construction shown and described.

Having described my invention, what I claim is:

1. In a motor vehicle, the combination of a rigid underframe flexibly connected at the front with a horizontally pivoted front axle and its wheels, bearings at the rear portion of the underframe having readily separable portions, axle inclosing shells pivotally mounted in said bearings, rear axle sections rotatably mounted in said shells, driving mechanism therefor removably and resiliently supported on the underframe, and a motor and gearing incorporated with said mechanism and with the axle, said portions comprising a readily removable power equipment for the vehicle, substantially as set forth.

2. The combination with the front and back axles and an underframe having a flexible connection with the front axle, readily separable bearings for the back axle, and an intervening transverse bearing bar; of a motor casing provided with inclosing tubular shells pivotally mounted upon the back axle and within the separable bearings and a front suspension member supported from the bearing bar with intervening upper and lower springs, and a motor within the casing geared with the back axle, said motor casing and its motor gearing, tubular shells, back axle and wheels being bodily removable from the underframe by detaching the front suspension member and separating the back axle bearings, substantially as set forth.

In testimony whereof I affix my signature in presence of two witnesses.

RICHARD RUEMELIN.

Witnesses:
G. S. GERLACH,
R. A. ORBISON.